United States Patent
Hashida

(10) Patent No.: US 10,514,804 B2
(45) Date of Patent: Dec. 24, 2019

(54) INPUT DEVICE AND INPUT DEVICE MANUFACTURING METHOD

(71) Applicant: Alps Alpine Co., Ltd., Tokyo (JP)

(72) Inventor: Junji Hashida, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 45 days.

(21) Appl. No.: 15/928,847

(22) Filed: Mar. 22, 2018

(65) Prior Publication Data
US 2018/0210573 A1 Jul. 26, 2018

Related U.S. Application Data

(63) Continuation of application No. PCT/JP2016/080196, filed on Oct. 12, 2016.

(30) Foreign Application Priority Data

Oct. 13, 2015 (JP) .................................. 2015-201739

(51) Int. Cl.
G06F 3/041 (2006.01)
G06F 3/042 (2006.01)
G06F 3/044 (2006.01)

(52) U.S. Cl.
CPC .............. G06F 3/042 (2013.01); G06F 3/044 (2013.01); *G06F 2203/04103* (2013.01)

(58) Field of Classification Search
CPC .......... G06F 3/041; G06F 3/045; G01R 27/26
See application file for complete search history.

(56) References Cited

U.S. PATENT DOCUMENTS

| | | | | |
|---|---|---|---|---|
| 2009/0015747 A1* | 1/2009 | Nishizawa | ........ | G02F 1/133308 349/58 |
| 2009/0201267 A1* | 8/2009 | Akimoto | ................. | G06F 3/041 345/173 |
| 2010/0103138 A1 | 4/2010 | Huang et al. | | |
| 2012/0020056 A1* | 1/2012 | Yamagata | ......... | G02F 1/133308 362/97.1 |

(Continued)

FOREIGN PATENT DOCUMENTS

| | | |
|---|---|---|
| EP | 2416338 | 2/2012 |
| JP | 2012-242871 | 12/2012 |

(Continued)

OTHER PUBLICATIONS

International Search Report from International Application No. PCT/JP2016/080196 dated Nov. 22, 2016.
(Continued)

*Primary Examiner* — Pegeman Karimi
(74) *Attorney, Agent, or Firm* — Beyer Law Group LLP

(57) ABSTRACT

As an input device capable of suppressing the occurrence of an optical issue and of achieving sufficient strength even if the input device is thin, an input device is provided which includes a first substrate formed into a light-transmissive curved surface and having optical isotropy or uniform optical uniaxial anisotropy in plane, a first electrode layer disposed on a surface of the first substrate, a second electrode layer opposing the first electrode layer, and a space adjusting resin layer disposed between the first electrode layer and the second electrode layer, being light-transmissive, and having optical isotropy.

17 Claims, 12 Drawing Sheets

(56) References Cited

U.S. PATENT DOCUMENTS

| | | | |
|---|---|---|---|
| 2012/0162560 A1* | 6/2012 | Oiwa | G02F 1/134309 |
| | | | 349/43 |
| 2013/0134627 A1 | 5/2013 | Hsu et al. | |
| 2013/0135831 A1 | 5/2013 | Hsu et al. | |
| 2013/0335375 A1 | 12/2013 | Nishikawa et al. | |
| 2015/0185889 A1 | 7/2015 | Nakamura | |
| 2016/0162077 A1 | 6/2016 | Kiyoshi et al. | |
| 2016/0306204 A1* | 10/2016 | Shin | G02F 1/133308 |
| 2018/0150153 A1* | 5/2018 | Yoon | G06F 3/041 |

FOREIGN PATENT DOCUMENTS

| | | |
|---|---|---|
| JP | 2013-114672 | 6/2013 |
| JP | 2013-246741 | 12/2013 |
| JP | 2014-002580 | 1/2014 |
| JP | 2015-75840 | 4/2015 |
| KR | 2014-6563 | 1/2014 |
| WO | 2015/025680 | 2/2015 |

OTHER PUBLICATIONS

Japanese Office Action for Japanese Application No. 2017-545208 dated Jan. 8, 2019.
Korean Office Action for Korean Application No. 10-2018-7010257 dated May 21, 2019.
European Search Report from European Application No. 1685410 dated Apr. 9, 2019.

\* cited by examiner

INPUT DEVICE AND INPUT DEVICE MANUFACTURING METHOD

CLAIM OF PRIORITY

This application is a Continuation of International Application No. PCT/JP2016/080196 filed on Oct. 12, 2016, which claims benefit of Japanese Patent Application No. 2015-201739 filed on Oct. 13, 2015. The entire contents of each application noted above are hereby incorporated by reference.

BACKGROUND OF THE INVENTION

1. Field of the Invention

The present invention relates to an input device and an input device manufacturing method and, more particularly, to an input device in which an electrode layer is disposed on a substrate having a two-dimensional or three-dimensional curved surface and a method for manufacturing such an input device.

2. Description of the Related Art

In various information processing apparatuses, light-transmissive input devices are disposed in front of display panels, such as color liquid crystal panels. These input devices are referred to as touch panels. In touch panels, capacitance is formed between electrodes. Coordinates of a position to which a person's finger is brought close are determined from a change in a movement of electric charges that occurs when the finger approaches. A capacitive sensor is used to detect this change in a movement of electric charges.

In recent years, display devices that display information on two-dimensional or three-dimensional curved surfaces have appeared. Touch panels are also required to be mounted in a shape matching such curved display surfaces.

Japanese Unexamined Patent Application Publication No. 2012-242871 and U.S. Patent Application Publication No. 2010/0103138 disclose curved touch panels and methods for manufacturing such curved touch panels. A curved touch panel described in Japanese Unexamined Patent Application Publication No. 2012-242871 is manufactured in the following manner. An electrode layer including a plurality of electrode regions is formed on a thermoplastic resin plate by using an electrically conductive ink containing an electrically conductive substance and a binder to create a patterned plate. The patterned plate is heated, and the softened patterned plate is shaped into a soft curved product. The soft curved product is cooled or is allowed to cool. Consequently, a touch panel is produced as a curved product.

U.S. Patent Application Publication No. 2010/0103138 discloses that a curved touch panel is manufactured by bending a flat flexible printed circuit board having a touch sensor function and then bonding this curved flexible printed circuit board and a curved substrate to each other.

However, in the case where touch panels have curved surfaces, an optical issue (so-called iridescence) occurs because of optical anisotropy of a panel material. To deal with such an optical issue, a material having optical isotropy can be used as the panel material. However, materials having optical isotropy are fragile and are unsuitable for a layer desired to be thin. For example, the sensitivity is desirably increased by decreasing a distance between a sensor electrode and a touched surface as much as possible in capacitive touch sensors. Thus, a surface-side layer is desirably made as thin as possible. However, the use of a material having optical isotropy for this layer causes an issue that the layer easily cracks. On the other hand, it is conceivable to make the thickness of the surface-side layer relatively thin by increasing a distance between sensor electrodes while maintaining the thickness of the surface-side layer. However, this configuration increases the thickness of the entire input device.

SUMMARY OF THE INVENTION

The present invention provides an input device capable of suppressing the occurrence of the optical issue and of achieving sufficient strength even if the display device is thin and a method for manufacturing such an input device.

An input device according to an aspect of the present invention includes a first substrate formed into a light-transmissive curved surface and having optical isotropy or uniform optical uniaxial anisotropy in plane, a first electrode layer disposed on a surface of the first substrate, a second electrode layer opposing the first electrode layer, and a space adjusting resin layer disposed between the first electrode layer and the second electrode layer, being light-transmissive, and having optical isotropy.

According to such a configuration, uneven birefringence caused by the first substrate and the space adjusting resin layer that are formed into curved surfaces is suppressed, and consequently an input device is provided that suppresses iridescence even if the input device has a curved surface. In addition, sufficient strength is successfully ensured by the space adjusting resin layer even if a material having optical isotropy is used.

In the input device according to the aspect of the present invention, a thickness of the first substrate may be less than a thickness of the space adjusting resin layer. This configuration can decrease a space between the first electrode layer and a surface of the first substrate, which is the touched surface, and increase a space between the first electrode layer and the second electrode layer, and can consequently increase the sensitivity for a change in capacitance.

The input device according to the aspect of the present invention may further include a lead wire configured to send a change in capacitance between the first electrode layer and the second electrode layer to outside. Consequently, a change in capacitance between the first electrode layer and the second electrode layer can be sent to outside via the lead wire.

The input device according to the aspect of the present invention may further include a second substrate disposed on a side of the second electrode layer opposite to the space adjusting resin layer, being light-transmissive, and having optical isotropy or uniform optical uniaxial anisotropy in plane. Consequently, the strength can be further increased by the structure including the second substrate.

In the input device according to the aspect of the present invention, the second substrate may be integrated with the first substrate, and a bent portion may be provided between the first substrate and the second substrate. Consequently, the integral structure of the first substrate and the second substrate can reduce the number of components and simplify the manufacturing process.

An input device manufacturing method according to an aspect of the present invention includes a step of bending a light-transmissive resin material into a curved surface to form a first substrate having optical isotropy or uniform optical uniaxial anisotropy in plane; a step of forming a first electrode layer on a surface of the first substrate; a step of injecting a light-transmissive optically-isotropic resin material into a mold in a state in which the first substrate having the first electrode layer thereon is inserted in the mold, to form a space adjusting resin layer, the space adjusting resin layer and the first substrate sandwiching the first electrode layer; and a step of forming a second electrode layer on the space adjusting resin layer, the second electrode layer opposing the first electrode layer.

According to such a configuration, uneven birefringence caused by the first substrate and the space adjusting resin layer that are formed into curved surfaces can be suppressed, and consequently an input device can be manufactured that suppresses iridescence even if the input device has a curved surface. In addition, since the space adjusting resin layer is formed by injecting a resin material into a mold in which the first substrate is inserted even if the first substrate is thin and curved, an input device can be manufactured that has sufficient strength even if the input device is thin.

An input device manufacturing method according to an aspect of the present invention includes a step of bending a light-transmissive resin material into a curved surface to form a first substrate having optical isotropy or uniform optical uniaxial anisotropy in plane; a step of forming a first electrode layer on a surface of the first substrate; a step of bending a light-transmissive resin material into a curved surface to form a second substrate having optical isotropy or uniform optical uniaxial anisotropy in plane; a step of forming a second electrode layer on a surface of the second substrate; and a step of injecting a light-transmissive optically-isotropic resin material into a mold in a state in which the first substrate having the first electrode layer thereon and the second substrate having the second electrode layer thereon are inserted in the mold with a predetermined space provided between the first substrate and the second substrate, to form a space adjusting resin layer between the first electrode layer and the second electrode layer.

According to such a configuration, the first electrode layer is formed on the first substrate that has been bent in advance and the second electrode layer is formed on the second substrate that has been bent in advance, and then the space adjusting resin layer is formed by injecting a resin material between the first electrode layer and the second electrode layer in a state in which the first substrate having the first electrode layer thereon and the second substrate having the second electrode layer thereon are inserted in the mold. Thus, an input device can be manufactured that has sufficient strength even if the input device is thin.

An input device manufacturing method according to an aspect of the present invention includes a step of forming a first electrode layer on a light-transmissive resin material and then bending the resin material into a curved surface to form a first substrate having optical isotropy or uniform optical uniaxial anisotropy in plane; a step of injecting a light-transmissive optically-isotropic resin material into a mold in a state in which the first substrate having the first electrode layer thereon is inserted in the mold, to form a space adjusting resin layer, the space adjusting resin layer and the first substrate sandwiching the first electrode layer; and a step of forming a second electrode layer on the space adjusting resin layer, the second electrode layer opposing the first electrode layer.

According to such a configuration, the resin material on which the first electrode layer has been formed is bent to form the first substrate, and the space adjusting resin layer is formed by injecting a resin material into a mold in a state in which the first substrate having the first electrode layer thereon is inserted in the mold. Thus, the first electrode layer can be formed on a flat surface, and an input device can be manufactured that has sufficient strength even if the input device is thin.

An input device manufacturing method according to an aspect of the present invention includes a step of forming a first electrode layer on a light-transmissive resin material and then bending the resin material into a curved surface to form a first substrate having optical isotropy or uniform optical uniaxial anisotropy in plane; a step of forming a second electrode layer on a light-transmissive resin material and then bending the resin material into a curved surface to form a second substrate having optical isotropy or uniform optical uniaxial anisotropy in plane; and a step of injecting a light-transmissive optically-isotropic resin material into a mold in a state in which the first substrate having the first electrode layer thereon and the second substrate having the second electrode layer thereon are inserted in the mold with a predetermined space provided between the first substrate and the second substrate, to form a space adjusting resin layer between the first electrode layer and the second electrode layer.

According to such a configuration, the resin material on which the first electrode layer has been formed is bent to form the first substrate and the resin material on which the second electrode layer has been formed is bent to form the second substrate, and then the space adjusting resin layer is formed by injecting a resin material between the first electrode layer and the second electrode layer in a state in which the first substrate having the first electrode layer thereon and the second substrate having the second electrode layer thereon are inserted in a mold. Thus, the first electrode layer and the second electrode layer can be formed on flat surfaces, and an input device can be manufactured that has sufficient strength even if the input device is thin.

According to the aspects of the present invention, an input device capable of suppressing the occurrence of an optical issue and of achieving sufficient strength even if the input device is thin and a method for manufacturing such an input device can be provided.

DESCRIPTION OF THE PREFERRED EMBODIMENTS

Embodiments of the present invention will be described below with reference to the drawings. Note that the same members are denoted by the same reference sign in the following description, and a description for a member that has been described once is appropriately omitted.

First Embodiment

Figure 1:
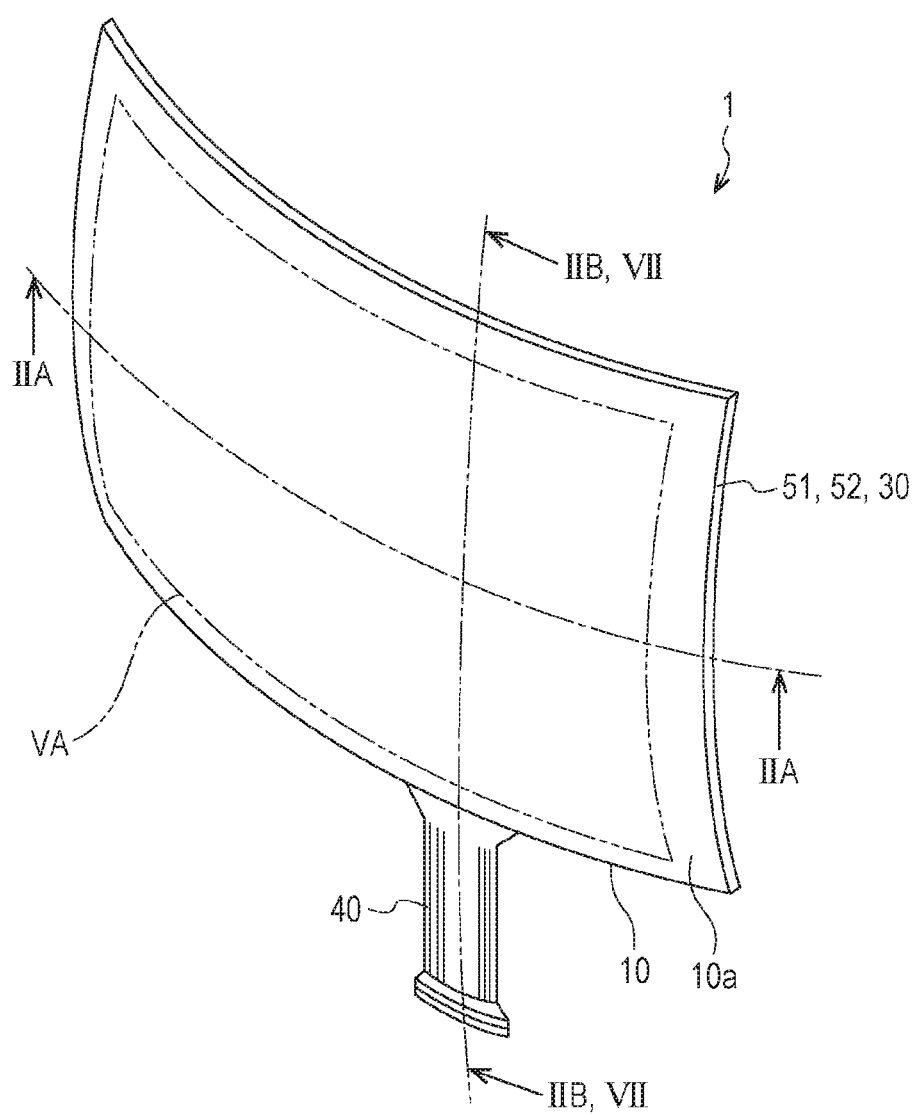
FIG. 1 is a perspective view of an input device according to a first embodiment.
Figure 2A:
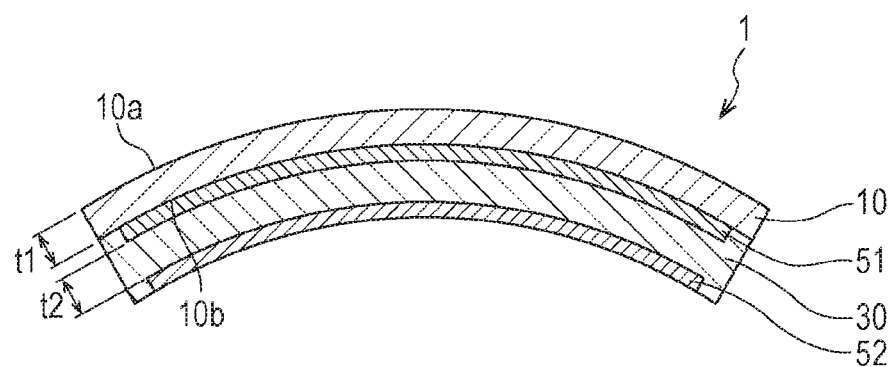
FIGS. 2A and 2B are schematic sectional views of the input device according to the first embodiment.
Figure 2B:
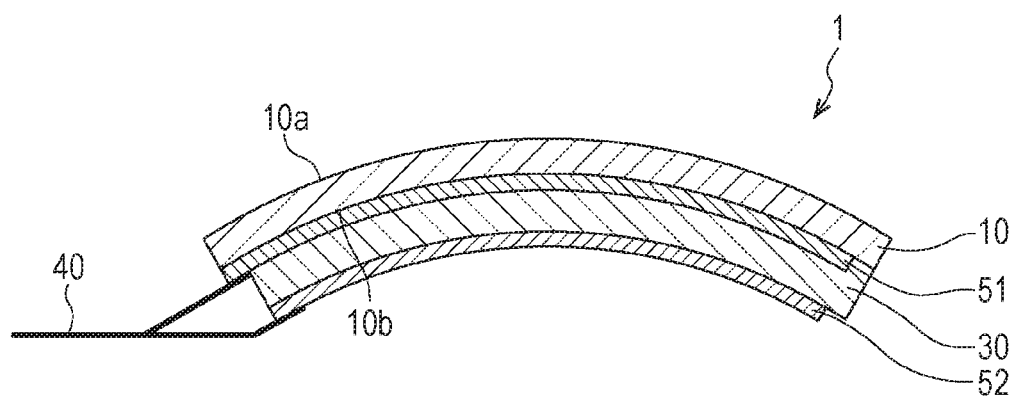

FIG. 1 is a perspective view of an input device according to a first embodiment. FIGS. 2A and 2B are schematic sectional views of the input device according to the first embodiment. Specifically, FIG. 2A is a sectional view taken along line IIA-IIA illustrated in FIG. 1, and FIG. 2B is a sectional view taken along line IIB-IIB illustrated in FIG. 1.

The input device according to this embodiment is, for example, a touch panel having a curved surface. An input device 1 includes a first substrate 10, a first electrode layer 51, a second electrode layer 52, and a space adjusting resin layer 30.

The first substrate 10 is light-transmissive and has a first surface 10a that is a curved surface. The first surface 10a is, for example, a three-dimensional convex curved surface. In this embodiment, the first surface 10a is a three-dimensional curved surface that is convex in both the vertical and horizontal directions. Note that the "light-transmissive" indicates a state where the visible light transmittance is greater than or equal to 50% (preferably greater than or equal to 80%) herein. Further, the haze of 6% or lower is suitable.

The first substrate 10 has a second surface 10b on a side opposite to the first surface 10a. Since the first substrate 10 has a uniform thickness, the second surface 10b is also a three-dimensional curved surface just like the first surface 10a. Note that the first surface 10a and the second surface 10b may have another shape, such as a two-dimensional curved surface or a concave surface. In this embodiment, a direction along a direction of the normal to the curved surface of the first surface 10a is referred to as a thickness direction or a stacking direction. The first surface 10a is an operation surface touched by a finger, a stylus, or the like.

The first substrate 10 has optical isotropy or optical uniaxial anisotropy that is uniform in plane of the first surface 10a. A material having good optical isotropy, such as COP (Cyclo Olefin Polymer), COC (Cyclo Olefin Copolymer), PC (Poly Carbonate), PMMA (Polymethyl Methacrylate), or TAC (Triacetyl Cellulose), is used for the first substrate 10.

If the first substrate 10 has optical isotropy, birefringence does not occur for light that passes through the first substrate 10. Thus, an optical issue such as iridescence does not occur even if the first substrate 10 has the first surface 10a that is a curved surface. In addition, if the first substrate 10 has optical uniaxial anisotropy that is uniform in plane of the first surface 10a, birefringence occurs in the uniaxial direction for light that passes through the first substrate 10 but this can be suppressed by using a simple polarizing plate. In addition, because of optical anisotropy that is uniform in plane, the occurrence of iridescence can be prevented even if the first substrate 10 has the first surface 10a that is a curved surface.

The first electrode layer 51 is disposed on the second surface 10b of the first substrate 10. The first electrode layer 51 is a light-transmissive electrode layer and serves as one of detection electrodes of a touch sensor. For the first electrode layer 51, ITO (Indium Tin Oxide), a light-transmissive organic electrically-conductive layer, a metal nanowire, or the like is used.

The second electrode layer 52 is disposed to oppose the first electrode layer 51. The second electrode layer 52 is a light-transmissive electrode layer and serves as the other one of the detection electrodes of the touch sensor. For the second electrode layer 52, ITO, a light-transmissive organic electrically-conductive layer, a metal nanowire, or the like is used. When the touch sensor is of a capacitive type, a touched position is detected by detecting a change caused in capacitance between the first electrode layer 51 and the second electrode layer 52 when a finger or the like touches (approaches) the first surface 10a of the first substrate 10.

The space adjusting resin layer 30 is disposed between the first electrode layer 51 and the second electrode layer 52. The space adjusting resin layer 30 is light-transmissive and optically isotropic. The space adjusting resin layer 30 is provided to set a space between the first electrode layer 51 and the second electrode layer 52 and supports the first substrate 10. The space adjusting resin layer 30 is disposed along the second surface 10b of the first substrate 10 to have a uniform thickness. A material having good optical isotropy, such as COP, COC, PC, PMMA, or TAC, is used for the space adjusting resin layer 30.

If such an input device 1 includes a capacitive touch sensor, the input device 1 may further include a lead wire 40 configured to send a change in capacitance between the first electrode layer 51 and the second electrode layer 52 to outside. The lead wire 40 includes a flexible circuit board that extends from the first substrate 10 to outside and wires that are connected to the first electrode layer 51 and the second electrode layer 52 and that are extended to outside of a display area VA of the first substrate 10 as illustrated in FIG. 1 and FIG. 2B.

In a capacitive touch sensor, a space between the first electrode layer 51 and the second electrode layer 52 is set by the thickness of the space adjusting resin layer 30, and consequently reference capacitance is determined. To increase the detection sensitivity of the touch sensor, it is desirable to set the space between the first electrode layer 51 and the second electrode layer 52 wide and set a space between the first electrode layer 51 and the first surface 10a of the first substrate 10 narrow. Thus, in this embodiment, a thickness t1 of the first substrate 10 is less than a thickness t2 of the space adjusting resin layer 30. For example, the thickness t1 is greater than or equal to approximately 0.2 mm and less than or equal to approximately 1.0 mm, and the thickness t2 is greater than or equal to approximately 1.0 mm and less than or equal to approximately 3.0 mm.

Since uneven birefringence caused by the first substrate 10 and the space adjusting resin layer 30 that are formed into curved surfaces is suppressed in the input device 1 having such a configuration, the input device 1 is provided that suppresses iridescence even if the input device 1 has a curved surface. In addition, even if a material having optical isotropy is used for the first substrate 10 and the first substrate 10 is formed to be thin, the entire input device 1 can have sufficient strength since the space adjusting resin layer 30 supports the first substrate 10.

Figure 3:
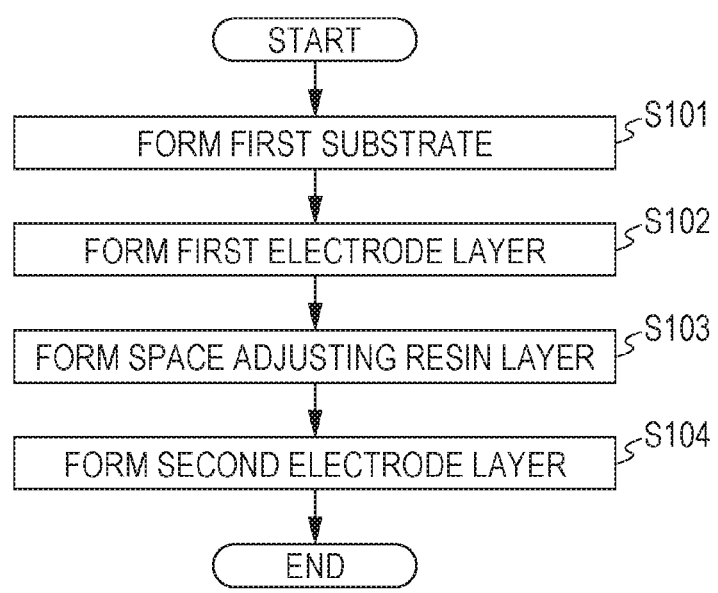
FIG. 3 is a flowchart illustrating a method for manufacturing the input device according to the first embodiment.

FIG. 3 is a flowchart illustrating a method for manufacturing the input device according to the first embodiment.

FIGS. 4A to 4E are schematic sectional views illustrating the method for manufacturing the input device according to the first embodiment.

As illustrated in FIG. 3, the method for manufacturing the input device 1 according to this embodiment includes formation of the first substrate 10 (step S101), formation of the first electrode layer 51 (step S102), formation of the space adjusting resin layer 30 (step S103), and formation of the second electrode layer 52 (step S104).

Figure 4A:
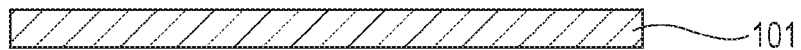
FIGS. 4A to 4E are schematic sectional views illustrating the method for manufacturing the input device according to the first embodiment.

First, in the formation of the first substrate 10 in step S101, a flat plate of a resin substrate 101 is prepared as illustrated in FIG. 4A. For example, a PC plate molded by casting or extrusion is used as the resin substrate 101. With the plate molded by casting or extrusion, the resin substrate 101 having optical isotropy or uniform optical uniaxial anisotropy can be obtained easily.

Figure 4B:
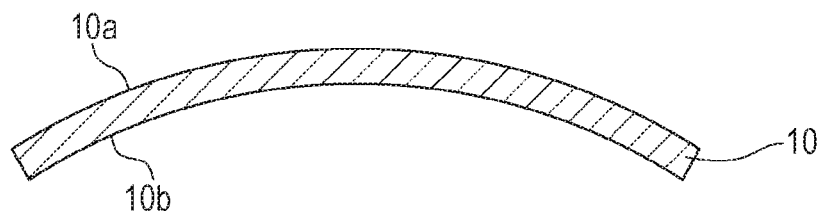

Then, the flat plate of the resin substrate 101 is bent to form the first substrate 10 having a curved surface as illustrated in FIG. 4B. To bend the flat plate of the resin substrate 101, the resin substrate 101 is heated to a predetermined temperature and is bent along a mold (for example, by thermoforming). The first surface 10$a$ and the second surface 10$b$, which are desired two-dimensional or three-dimensional curved surfaces, are formed by the shape of the mold. The optical isotropy or uniform optical uniaxial anisotropy is maintained in the first substrate 10 obtained by bending the resin substrate 101.

Figure 4C:
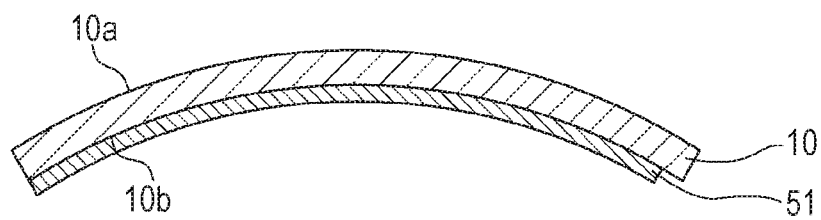

Then, in the formation of the first electrode layer 51 in step S102, the first electrode layer 51 is formed in a desired pattern along the second surface 10$b$ of the curved first substrate 10 as illustrated in FIG. 4C. The first electrode layer 51 is formed by using photolithography and etching, or screen printing. For example, when the first electrode layer 51 is formed by using photolithography and etching, for example, an ITO layer is formed on the second surface 10$b$ of the first substrate 10 by spattering, and a resist is formed on the ITO layer. The resist is exposed to light and developed to be patterned, and then the ITO layer is etched. Thereafter, the resist is removed. In this way, the first electrode layer 51, which is the patterned ITO layer, is formed on the second surface 10$b$ of the first substrate 10.

Figure 4D:
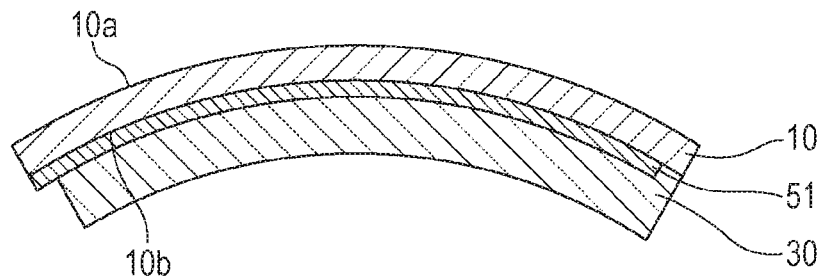

Then, in the formation of the space adjusting resin layer 30 in step S103, the first substrate 10 having the first electrode layer 51 thereon illustrated in FIG. 4C is inserted into a mold for injection molding, and then a light-transmissive optically-isotropic resin material is injected into the mold to form the space adjusting resin layer 30 illustrated in FIG. 4D. That is, a stack of the first substrate 10, the first electrode layer 51, and the space adjusting resin layer 30 is created by in-mold lamination (IML).

Figure 4E:
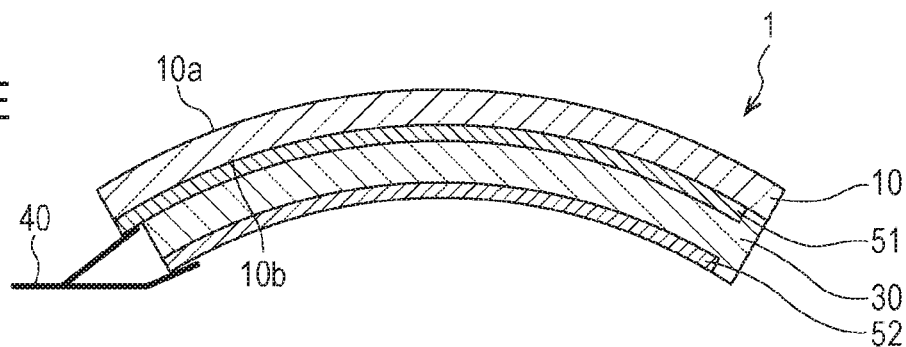

Then, in the formation of the second electrode layer 52 in step S104, the second electrode layer 52 is formed in a desired pattern along a surface of the space adjusting resin layer 30 opposite to the first electrode layer 51 as illustrated in FIG. 4E. The second electrode layer 52 is formed by using photolithography and etching, or screen printing just like the first electrode layer 51. Thereafter, the lead wire 40 is connected to the first electrode layer 51 and the second electrode layer 52 to conduct. In this way, the input device 1 completes.

According to such a manufacturing method, since uneven birefringence caused by the first substrate 10 and the space adjusting resin layer 30 that are formed into curved surfaces is suppressed, the input device 1 can be manufactured that suppresses iridescence even if the input device 1 has a curved surface. In addition, even if the first substrate 10 is thin and curved, the space adjusting resin layer 30 is formed by injecting a resin material into a mold in which the first substrate 10 is inserted. Thus, the input device 1 can be manufactured that has sufficient strength even if the input device 1 is thin. In addition, since the space adjusting resin layer 30 is formed by injecting a resin into a mold, the thickness of the space adjusting resin layer 30, that is, the space between the first electrode layer 51 and the second electrode layer 52, can be set precisely.

Figure 5:
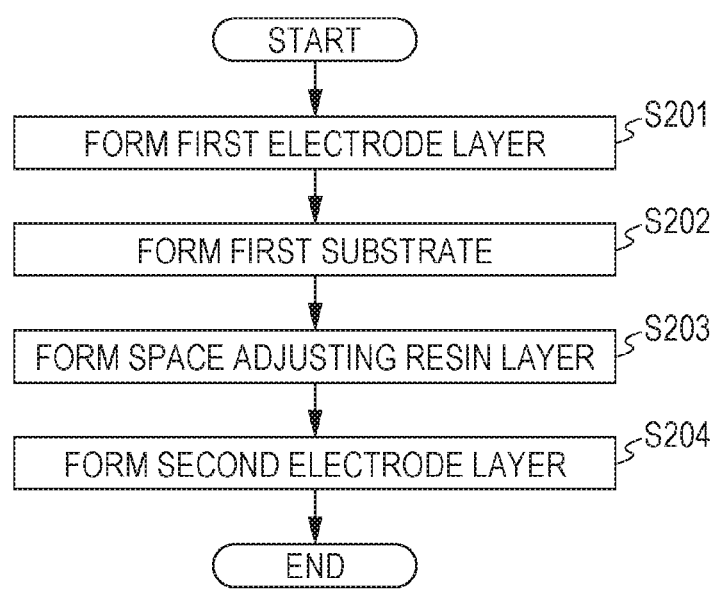
FIG. 5 is a flowchart illustrating another method for manufacturing the input device according to the first embodiment.

FIG. 5 is a flowchart illustrating another method for manufacturing the input device according to the first embodiment. FIGS. 6A to 6D are schematic sectional views illustrating the other method for manufacturing the input device according to the first embodiment.

As illustrated in FIG. 5, the other method for manufacturing the input device 1 according to this embodiment includes formation of the first electrode layer 51 (step S201), formation of the first substrate 10 (step S202), formation of the space adjusting resin layer 30 (step S203), and formation of the second electrode layer 52 (step S204).

First, in the formation of the first electrode layer 51 in step S201, the first electrode layer 51 is formed in a desired pattern on a surface 101$b$ of the flat plate of the resin substrate 101. A light-blocking layer 53 may be disposed on the surface 101$b$ of the resin substrate 101 if necessary. Since the first electrode layer 51 is formed on the flat plate of the resin substrate 101, the first electrode layer 51 is formed easily and precisely.

Figure 6A:
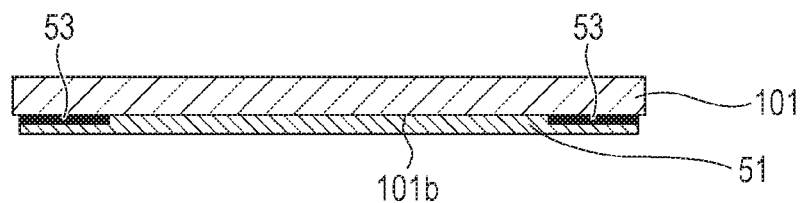
FIGS. 6A to 6D are schematic sectional views illustrating the other method for manufacturing the input device according to the first embodiment.
Figure 6B:
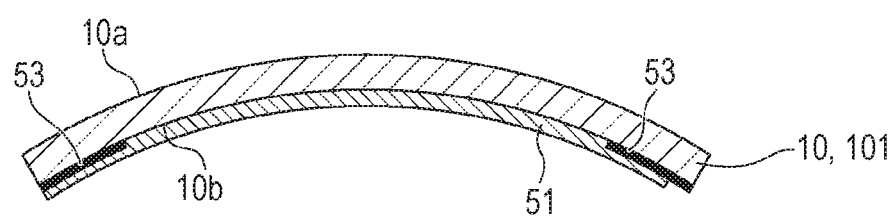

Then, in the formation of the first substrate 10 in step S202, the resin substrate 101 is bent to have a desired two-dimensional or three-dimensional curved surface by, for example, thermoforming to create the first substrate 10 as illustrated in FIG. 6B. At that time, the first electrode layer 51 formed on the resin substrate 101 is also bent.

Figure 6C:
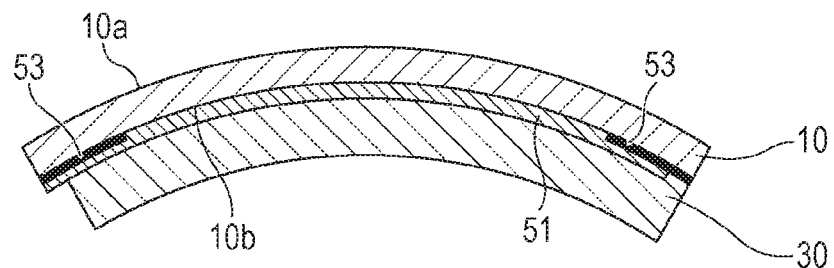

Then, in the formation of the space adjusting resin layer 30 in step S203, the first substrate 10 having the first electrode layer 51 thereon illustrated in FIG. 6B is inserted into a mold for injection molding, and a light-transmissive optically-isotropic resin material is injected into the mold to form the space adjusting resin layer 30 illustrated in FIG. 6C. That is, a stack of the first substrate 10, the first electrode layer 51, and the space adjusting resin layer 30 is created by in-mold lamination (IML).

Figure 6D:
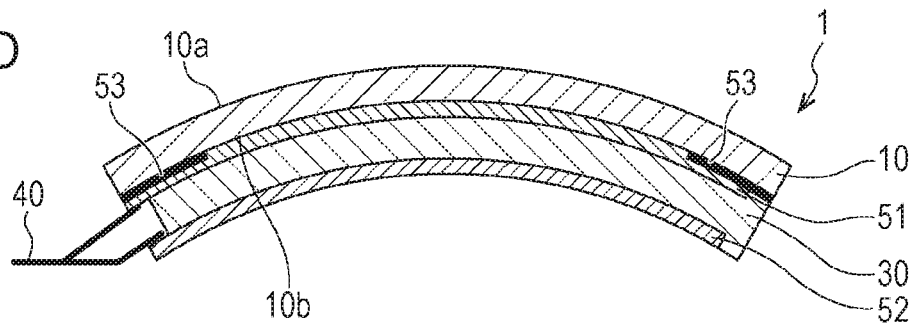

Then, in the formation of the second electrode layer 52 in step S204, the second electrode layer 52 is formed in a desired pattern along a surface of the space adjusting resin layer 30 located on a side opposite to the first electrode layer 51 as illustrated in FIG. 6D. The second electrode layer 52 is formed by using photolithography and etching, or screen printing just like the first electrode layer 51. Thereafter, the lead wire 40 is connected to the first electrode layer 51 and the second electrode layer 52 to conduct. In this way, the input device 1 completes.

According to such a manufacturing method, since the first electrode layer 51 is formed in a state where the first substrate 10 is a flat plate, the desired pattern can be formed precisely and easily. In addition, since the space adjusting resin layer 30 is formed by IML, the space adjusting resin layer 30 can be formed to have a precise thickness. Thus, the space between the first electrode layer 51 and the second electrode layer 52 can be set precisely, and the input device 1 can be manufactured easily that has sufficient strength even if the input device 1 is thin.

Second Embodiment

Figure 7:
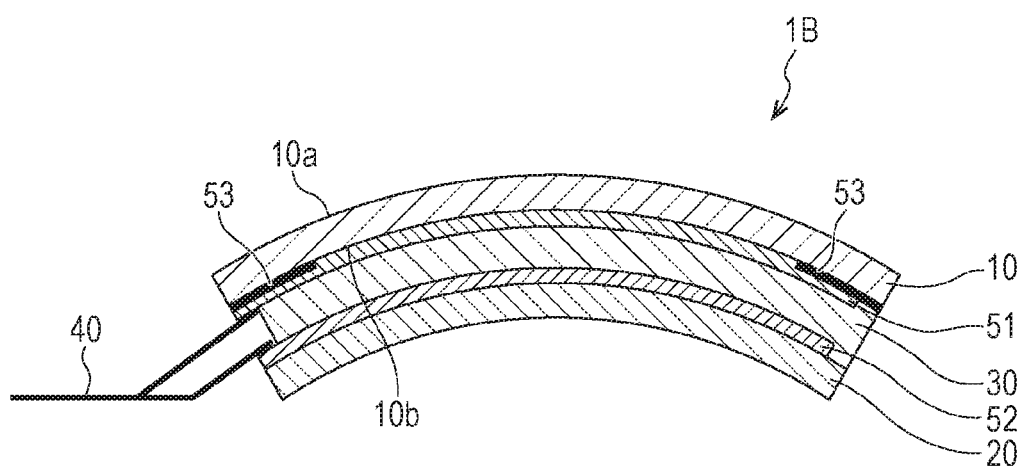
FIG. 7 is a schematic sectional view illustrating an input device according to a second embodiment.

FIG. 7 is a schematic sectional view illustrating an input device according to a second embodiment. FIG. 7 is a schematic sectional view at a position corresponding to line VII-VII illustrated in FIG. 1.

An input device 1B according to this embodiment includes a second substrate 20 in addition to the first substrate 10, the first electrode layer 51, the space adjusting resin layer 30, and the second electrode layer 52 of the input device 1 according to the first embodiment. The second substrate 20 is disposed on a side of the second electrode layer 52 opposite to the space adjusting resin layer 30.

The second substrate 20 is light-transmissive and has optical isotropy or optical uniaxial anisotropy that is uniform in plane.

That is, the input device 1B according to this embodiment has a structure in which the first electrode layer 51, the second electrode layer 52, and the space adjusting resin layer 30 are interposed between the first substrate 10 and the second substrate 20. A material having good optical isotropy, such as COP, COC, PC, PMMA, or TAC, is used for the second substrate 20 just like the first substrate 10. With the structure including the second substrate 20 in this way, the strength of the input device 1B is further increased.

Figure 8:
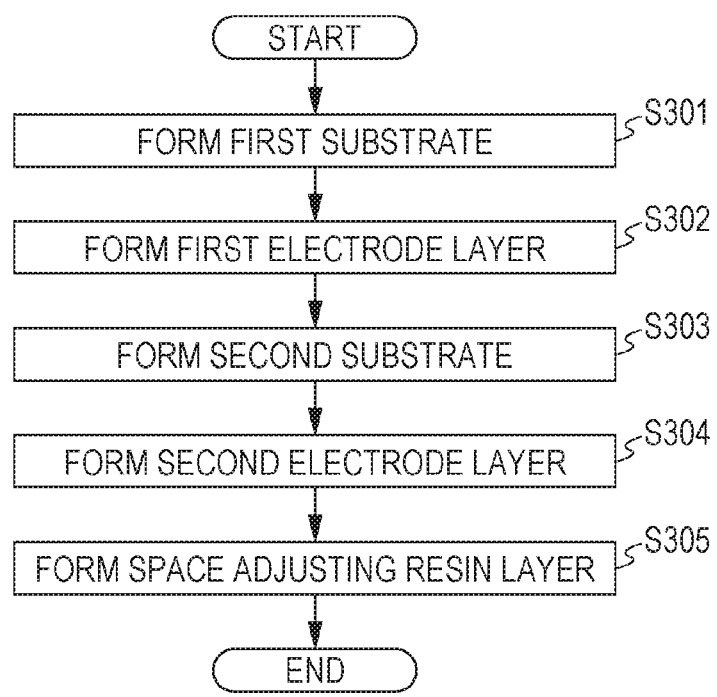
FIG. 8 is a flowchart illustrating a method for manufacturing the input device according to the second embodiment.

FIG. 8 is a flowchart illustrating a method for manufacturing the input device according to the second embodiment. FIGS. 9A to 9E are schematic sectional views illustrating the method for manufacturing the input device according to the second embodiment.

As illustrated in FIG. 8, the method for manufacturing the input device 1B according to this embodiment includes formation of the first substrate 10 (step S301), formation of the first electrode layer 51 (step S302), formation of the second substrate 20 (step S303), formation of the second electrode layer 52 (step S304), and formation of the space adjusting resin layer 30 (step S305).

Figure 9A:
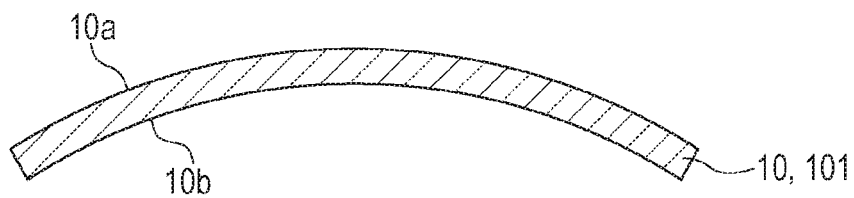
FIGS. 9A to 9E are schematic sectional views illustrating the method for manufacturing the input device according to the second embodiment.
Figure 9B:
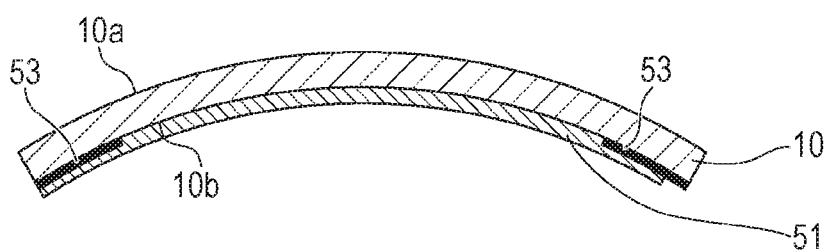

The formation of the first substrate 10 in step S301 and the formation of the first electrode layer 51 in step S302 are substantially the same as step S101 and step S102 illustrated in FIG. 3, respectively. FIG. 9A illustrates a state in which the first substrate 10 is formed by bending a flat plate of the resin substrate 101 by thermoforming, for example. In addition, FIG. 9B illustrates a state in which the first electrode layer 51 is formed on the second surface 10b of the first substrate 10. The light-blocking layer 53 may be disposed on the second surface 10b of the first substrate 10 if necessary.

Figure 9C:
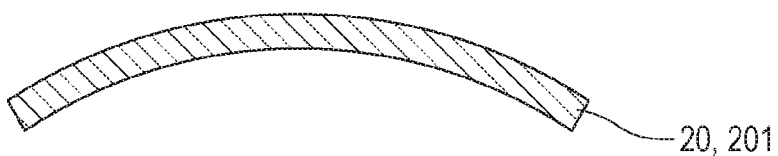

Then, in the formation of the second substrate 20 in step S303, a flat plate of a resin substrate 201 is prepared and is bent by, for example, thermoforming to form the second substrate 20 as in the formation of the first substrate 10. FIG. 9C illustrates the curved second substrate 20. For example, a PC plate molded by casting or extrusion is used as the resin substrate 201.

Figure 9D:
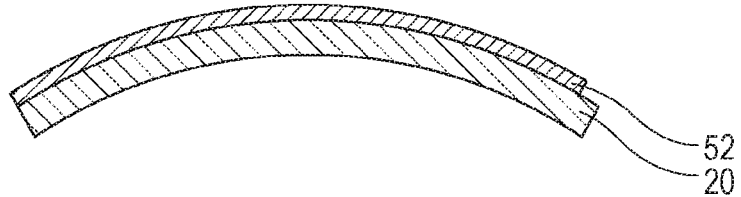

Then, in the formation of the second electrode layer 52 in step S304, the second electrode layer 52 is formed on a surface of the curved second substrate 20 as in the formation of the first electrode layer 51. FIG. 9D illustrates a state in which the second electrode layer 52 is formed on the surface of the curved second substrate 20.

Figure 9E:
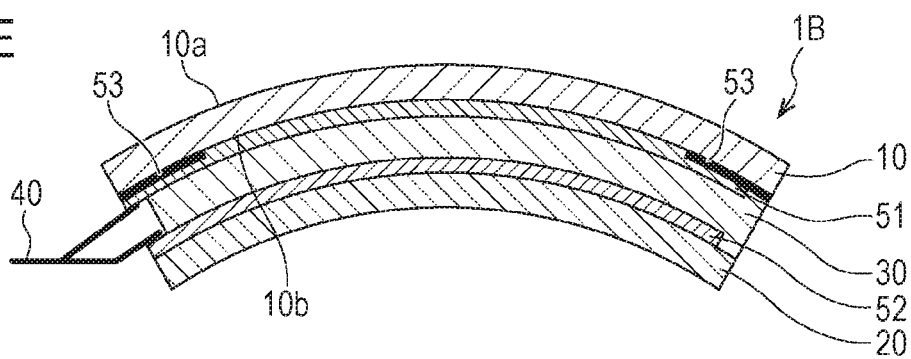

Then, in the formation of the space adjusting resin layer 30 in step S305, the first substrate 10 having the first electrode layer 51 thereon illustrated in FIG. 9B and the second substrate 20 having the second electrode layer 52 thereon illustrated in FIG. 9D are inserted into a mold for injection molding, and a light-transmissive optically-isotropic resin material is injected into the mold to form the space adjusting resin layer 30 illustrated in FIG. 9E. That is, a resin material is injected between the first substrate 10 and the second substrate 20, and a stack of the first substrate 10, the first electrode layer 51, the space adjusting resin layer 30, the second electrode layer 52, and the second substrate 20 are created by IML. Thereafter, the lead wire 40 is connected to the first electrode layer 51 and the second electrode layer 52 to conduct. In this way, the input device 1B completes.

According to such a manufacturing method, the first electrode layer 51 is formed on the first substrate 10 that has been bent in advance, and the second electrode layer 52 is formed on the second substrate 20 that has been bent in advance. Thereafter, the space adjusting resin layer 30 is formed by injecting a resin material between the first electrode layer 51 and the second electrode layer 52 in a state in which the first substrate 10 having the first electrode layer 51 thereon and the second substrate 20 having the second electrode layer 52 thereon are inserted in a mold. Thus, the space adjusting resin layer 30 can be formed to have a precise thickness. Consequently, the space between the first electrode layer 51 and the second electrode layer 52 can be set precisely, and the input device 1B can be manufactured easily that has sufficient strength even if the input device 1B is thin.

Figure 10:
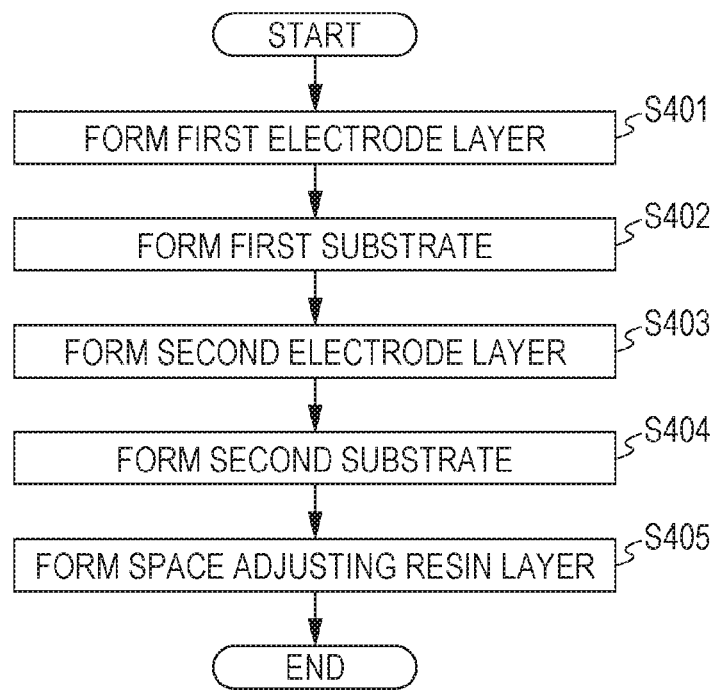
FIG. 10 is a flowchart illustrating another method for manufacturing the input device according to the second embodiment.

FIG. 10 is a flowchart illustrating another method for manufacturing the input device according to the second embodiment. FIGS. 11A to 11E are schematic sectional views illustrating the other method for manufacturing the input device according to the second embodiment.

As illustrated in FIG. 10, the other method for manufacturing the input device 1B according to this embodiment includes formation of the first electrode layer 51 (step S401), formation of the first substrate 10 (step S402), formation of the second electrode layer 52 (step S403), formation of the second substrate 20 (step S404), and formation of the space adjusting resin layer 30 (step S405).

Figure 11A:
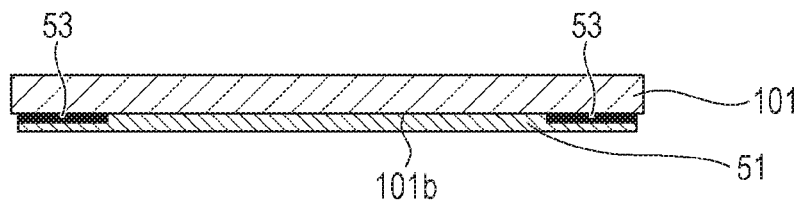
FIGS. 11A to 11E are schematic sectional views illustrating the other method for manufacturing the input device according to the second embodiment.

First, in the formation of the first electrode layer 51 in step S401, the first electrode layer 51 is formed in a desired pattern on the surface 101b of the flat plate of the resin substrate 101 as illustrated in FIG. 11A. The light-blocking layer 53 may be disposed on the surface 101b of the resin substrate 101 if necessary. Since the first electrode layer 51 is formed on the flat plate of the resin substrate 101, the first electrode layer 51 is formed easily and precisely.

Figure 11B:
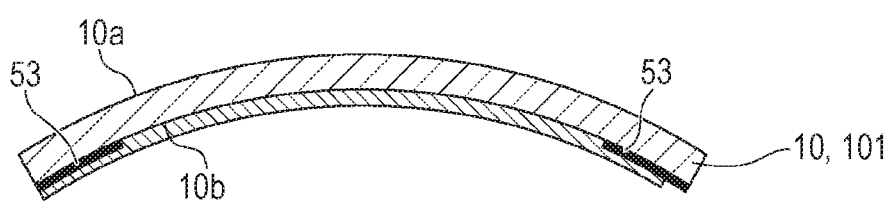

Then, in the formation of the first substrate 10 in step S402, the resin substrate 101 is bent to have a desired two-dimensional or three-dimensional curved surface by, for example, thermoforming to create the first substrate 10 as illustrated in FIG. 11B. At that time, the first electrode layer 51 formed on the resin substrate 101 is also bent.

Figure 11C:
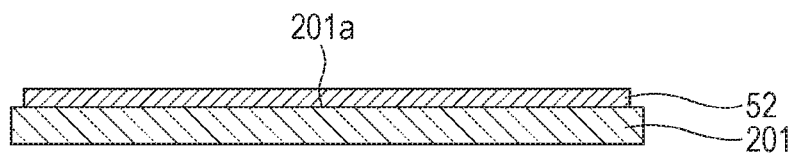

Then, in the formation of the second electrode layer 52 in step S403, the second electrode layer 52 is formed in a desired pattern on a surface 201a of the flat plate of the resin substrate 201 as illustrated in FIG. 11C. Since the second electrode layer 52 is formed on the flat plate of the resin substrate 201, the second electrode layer 52 is formed easily and precisely.

Figure 11D:
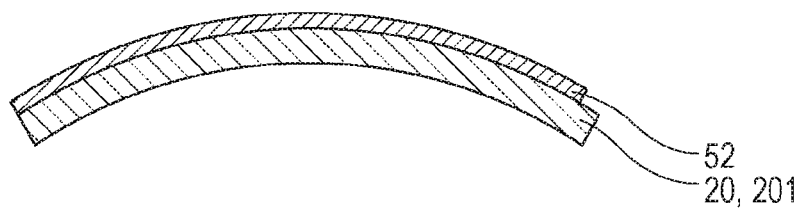

Then, in the formation of the second substrate 20 in step S404, the resin substrate 201 is bent to have a desired two-dimensional or three-dimensional curved surface by, for example, thermoforming to create the second substrate 20 as illustrated in FIG. 11D. At that time, the second electrode layer 52 formed on the resin substrate 201 is also bent.

Figure 11E:
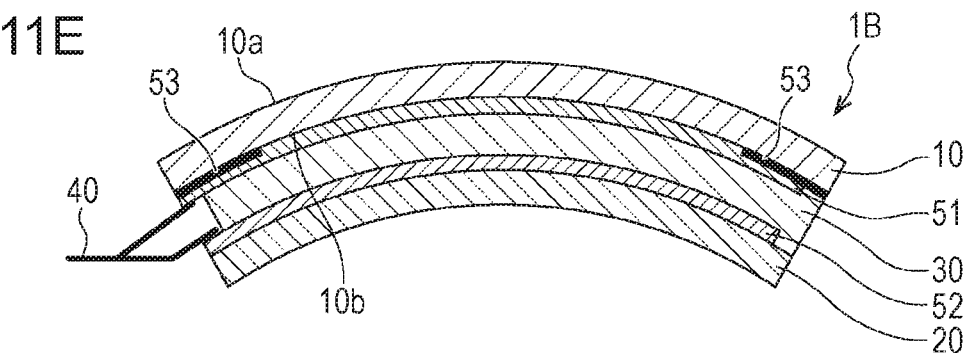

Then, in the formation of the space adjusting resin layer 30 in step S405, the first substrate 10 having the first electrode layer 51 thereon illustrated in FIG. 11B and the second substrate 20 having the second electrode layer 52 thereon illustrated in FIG. 11D are inserted into a mold for injection molding, and a light-transmissive optically-isotropic resin material is injected into the mold to form the space adjusting resin layer 30 illustrated in FIG. 11E. That is, the resin material is injected between the first substrate 10 and the second substrate 20, and a stack of the first substrate 10, the first electrode layer 51, the space adjusting resin layer 30, the second electrode layer 52, and the second substrate 20 is created by IML. Thereafter, the lead wire 40 is connected to the first electrode layer 51 and the second electrode layer 52 to conduct. In this way, the input device 1B completes.

According to such a manufacturing method, since the first electrode layer 51 and the second electrode layer 52 are formed in a state in which the first substrate 10 and the second substrate 20 are flat plates, the desired patterns can be formed precisely and easily. In addition, since the space adjusting resin layer 30 is formed by IML, the space adjusting resin layer 30 can be formed to have a precise thickness. Consequently, the space between the first electrode layer 51 and the second electrode layer 52 can be set precisely, and the input device 1B can be manufactured easily that has sufficient strength even if the input device 1B is thin.

Modifications

Figure 12A:
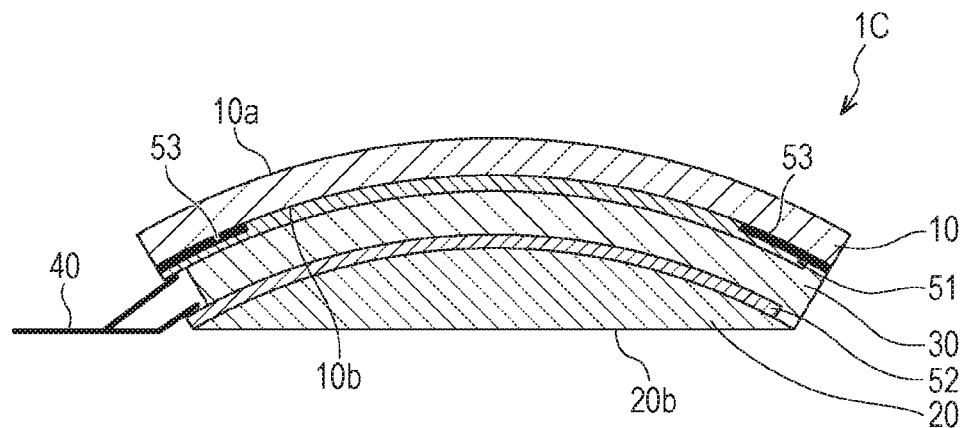
FIGS. 12A and 12B are schematic sectional views illustrating modifications.
Figure 12B:
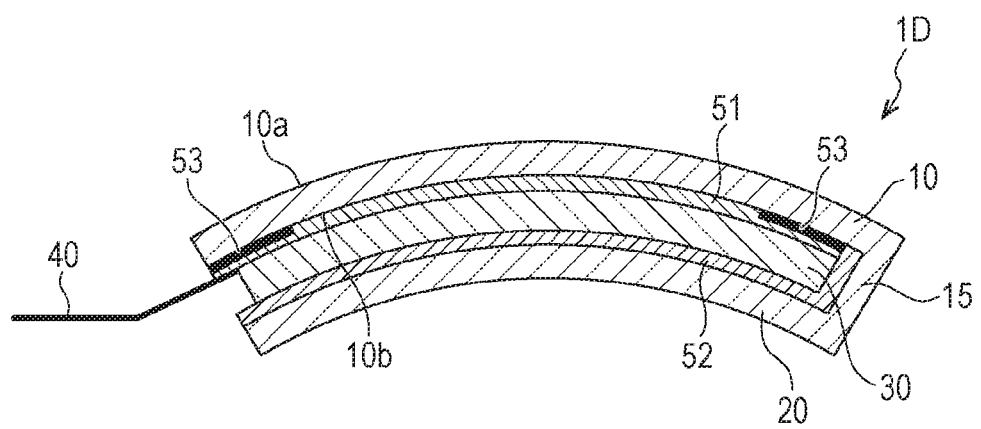

FIGS. 12A and 12B are schematic sectional views illustrating modifications.

In an input device 1C illustrated in FIG. 12A, a surface 20b of the second substrate 20 located on a side opposite to the second electrode layer 52 is flat. A molded member obtained by injection molding is used as this second substrate 20. Since the surface 20b of the second substrate 20 is flat, it becomes easier to join this surface 20b and a flat member. For example, when a liquid crystal panel having a flat display surface is bonded to the surface 20b of the second substrate 20, the flat surfaces can be bonded securely.

In an input device 1D illustrated in FIG. 12B, the second substrate 20 is integrated with the first substrate 10. A bent portion 15 is provided between the first substrate 10 and the second substrate 20. An integrated item of the first substrate 10 and the second substrate 20 is folded with this bent portion 15 by approximately by 180 degrees so that the first substrate 10 and the second substrate 20 face each other.

Since the first substrate 10 and the second substrate 20 are integrated together, the first electrode layer 51 and the second electrode layer 52 can be formed on a single long resin substrate in a single step. In addition, when the space adjusting resin layer 30 is formed by IML, the single resin substrate is bent with the bent portion 15 so that the first substrate 10 and the second substrate 20 face each other. The resin substrate is then inserted into a mold in this state, and a resin material is injected. In this way, the space adjusting resin layer 30 is formed by IML.

With such a configuration of the input device 1D, the number of components can be reduced and the manufacturing process can be simplified. In addition, connections between the lead wire 40 and the first electrode layer 51 and the second electrode layer 52 can be collected to the first substrate 10, for example, making connection of the lead wire 40 easier.

As described above, according to the embodiments, the input devices 1, 1B, 1C, and 1D capable of suppressing the occurrence of an optical issue and of achieving sufficient strength and the methods for manufacturing the input devices 1, 1B, 1C, and 1D can be provided.

Although the embodiments have been described above, the present invention is not limited to these examples. For example, embodiments obtained by a person skilled in the art by adding a component to each of the above-described embodiments, by removing a component from each of the above-described embodiment, by modifying the design of each of the above-described embodiment, and by appropriately combining the features of the respective embodiments are also within the scope of the present invention as long as such obtained embodiments have the essence of the present invention.

What is claimed is:

1. An input device comprising:
    a first resin substrate having a first curved surface and a second curved surface opposite to the first curved surface, the first resin substrate being light-transmissive and having optical isotropy or optical uniaxial anisotropy uniform in the first curved surface;
    a first electrode layer disposed on the second curved surface of the first resin substrate;
    a second electrode layer opposing the first electrode layer; and
    a space adjusting resin layer disposed between the first electrode layer and the second electrode layer and formed by injecting a resin, the space adjusting resin layer being light-transmissive and having optical isotropy,
    wherein the first curved surface of the first resin substrate is an operation surface on which an input operation is performed, and has the space adjusting resin layer between the first and second electrode layers has a thickness greater than that of the first resin substrate.

2. The input device according to claim 1, further comprising:
    a second resin substrate disposed on the second electrode layer on an opposite side of the space adjusting resin layer, the second resin substrate being light-transmissive and having optical isotropy or optical uniaxial anisotropy uniform in a surface thereof.

3. The input device according to claim 2, further comprising:
    a lead wire configured to transmit a change in capacitance formed between the first electrode layer and the second electrode layer to outside.

4. The input device according to claim 2, wherein the second resin substrate is integrated with the first resin substrate, and a bent portion is provided between the first resin substrate and the second resin substrate.

5. The input device according to claim 2, wherein the second resin substrate has a third curved surface on which the second electrode layer is disposed, and a fourth surface opposite to the third surface.

6. The input device according to claim 5, wherein the fourth surface is a curved surface.

7. The input device according to claim 5, wherein the fourth surface is a flat surface.

8. The input device according to claim 1, further comprising:
    a lead wire configured to transmit a change in capacitance formed between the first electrode layer and the second electrode layer to outside.

9. The input device according to claim 1, wherein a thickness of the first resin substrate smaller than that of the space adjusting layer and a distance between the first electrode layer and the second electrode layers given by the thickness of the space adjusting resin layer greater than that of the first resin layer together provide an increased sensitivity to the input operation onto the first curved surface, while the thickness of the space adjusting resin layer greater than that of the first resin layer provides support for the thinner first resin substrate.

10. A method for manufacturing an input device, the method comprising:
    forming a first resin substrate by bending a light-transmissive resin material so as to have a first curved surface and a second curved surface opposite to the first curved surface, the first resin substrate having optical isotropy or optical uniaxial anisotropy uniform in the first curved surface;

forming a first electrode layer on the second curved surface of the first resin substrate;

forming a space adjusting resin layer by injecting a light-transmissive optically-isotropic resin material into a mold in which the first resin substrate having the first electrode layer thereon is inserted the space adjusting resin layer and the first resin substrate sandwiching the first electrode layer therebetween; and forming a second electrode layer on the space adjusting resin layer on an opposite side of the first electrode layer, wherein the space adjusting resin layer between the first and second electrode layers has a thickness greater than a thickness of the first resin substrate.

11. The method for manufacturing an input device according to claim 10, wherein a thickness of the first resin substrate smaller than that of the space adjusting layer and a distance between the first electrode layer and the second electrode layers given by the thickness of the space adjusting resin layer greater than that of the first resin layer together provide an increased sensitivity to the input operation onto the first curved surface, while the thickness of the space adjusting resin layer greater than that of the first resin layer provides support for the thinner first resin substrate.

12. A method for manufacturing an input device, the method comprising:

forming a first resin substrate by bending a first light-transmissive resin material so as to have a first curved surface and a second curved surface opposite to the first curved surface, the first resin substrate having optical isotropy or optical uniaxial anisotropy uniform in the first curved surface;

forming a first electrode layer on the second curved surface of the first resin substrate;

forming a second resin substrate by bending a second light-transmissive resin material to form a second resin substrate with a third curved surface and a fourth curved surface opposite to the third curved surface, the first resin substrate having optical isotropy or optical uniaxial anisotropy uniform in the third curved surface;

forming a second electrode layer on the third curved surface of the second resin substrate; and forming a space adjusting resin layer by injecting a light-transmissive optically-isotropic resin material into a mold in which the first resin substrate having the first electrode layer thereon and the second resin substrate having the second electrode layer thereon are inserted with a predetermined space provided between the first resin substrate and the second resin substrate, the space adjusting resin layer being provided between the first electrode layer and the second electrode layer and having a thickness between the first and second electrode layers greater than a thickness of the first resin substrate.

13. The method for manufacturing an input device according to claim 12, wherein a thickness of the first resin substrate smaller than that of the space adjusting layer and a distance between the first electrode layer and the second electrode layers given by the thickness of the space adjusting resin layer greater than that of the first resin layer together provide an increased sensitivity to the input operation onto the first curved surface, while the thickness of the space adjusting resin layer greater than that of the first resin layer provides support for the thinner first resin substrate.

14. A method for manufacturing an input device, the method comprising:

providing a light-tranmissive resin material having a first surface and a second surface opposite to the first surface and forming a first electrode layer on the second surface of the resin material;

bending the resin material with the first electrode layer thereon to form a first resin substrate with a first curved surface and a second curved surface opposite to the first curved surface, the first resin substrate having optical isotropy or optical uniaxial anisotropy uniform in the first curved surface;

forming a space adjusting resin layer by injecting a light-transmissive optically-isotropic resin material into a mold in which the first resin substrate having the first electrode layer thereon is inserted, the space adjusting resin layer and the first resin substrate sandwiching the first electrode layer therebetween; and forming a second electrode layer on the space adjusting resin layer on an opposite side of the first electrode layer, wherein the space adjusting resin layer between the first and second electrode layers has a thickness greater than a thickness of the first resin substrate.

15. The method for manufacturing an input device according to claim 14, wherein a thickness of the first resin substrate smaller than that of the space adjusting layer and a distance between the first electrode layer and the second electrode layers given by the thickness of the space adjusting resin layer greater than that of the first resin layer together provide an increased sensitivity to the input operation onto the first curved surface, while the thickness of the space adjusting resin layer greater than that of the first resin layer provides support for the thinner first resin substrate.

16. A method for manufacturing an input device, the method comprising:

providing a first light-transmissive resin material having a first surface and a second surface opposite to the first surface and forming a first electrode layer on the second surface of the first resin material;

bending the first resin material with the first electrode thereon to form a first resin substrate with a first curved surface and a second curved surface opposite to the first curved surface, the first resin substrate having optical isotropy or optical uniaxial anisotropy uniform in the first curved surface;

providing a second light-transmissive resin material having a third surface and a fourth surface opposite to the third surface and forming a second electrode layer on the third surface of the second resin material;

bending the second resin material with the second electrode thereon to form a second resin substrate with a third curved surface and a fourth curved surface opposite to the third curved surface, the second resin substrate having optical isotropy or optical uniaxial anisotropy uniform in the third curved surface; and forming a space adjusting layer by injecting a light-transmissive optically-isotropic resin material into a mold in which the first resin substrate having the first electrode layer thereon and the second resin substrate having the second electrode layer thereon are inserted with a predetermined space provided between the first resin substrate and the second resin substrate, the space adjusting resin layer being provided between the first electrode layer and the second electrode layer so as to have a thickness greater than a thickness of the first resin substrate.

17. The method for manufacturing an input device according to claim 16, wherein a thickness of the first resin substrate smaller than that of the space adjusting layer and a distance between the first electrode layer and the second electrode layers given by the thickness of the space adjusting resin layer greater than that of the first resin layer together provide an increased sensitivity to the input operation onto the first curved surface, while the thickness of the space adjusting resin layer greater than that of the first resin layer provides support for the thinner first resin substrate.

* * * * *